(12) United States Patent
Colbath

(10) Patent No.: US 6,826,574 B1
(45) Date of Patent: Nov. 30, 2004

(54) AUTOMATIC PROFILER

(75) Inventor: Mark Allan Colbath, Bedford, TX (US)

(73) Assignee: Gateway, Inc., Irvine, CA (US)

( * ) Notice: Subject to any disclaimer, the term of this patent is extended or adjusted under 35 U.S.C. 154(b) by 0 days.

(21) Appl. No.: 09/384,490

(22) Filed: Aug. 27, 1999

(51) Int. Cl.⁷ ............................ G06F 7/00; G06F 17/30
(52) U.S. Cl. ............................. 707/102; 707/3; 707/9
(58) Field of Search ........................ 707/1–3, 5, 6, 707/9, 10, 100, 103, 104.1, 513, 530, 532, 533, 200–205; 345/733, 742, 744, 745, 747; 715/513, 532, 533, 530

(56) References Cited

U.S. PATENT DOCUMENTS

| | | | | |
|---|---|---|---|---|
| 5,047,959 A | * | 9/1991 | Phillips et al. | 345/744 |
| 5,129,056 A | * | 7/1992 | Eagen et al. | 395/161 |
| 5,544,360 A | * | 8/1996 | Lewak et al. | 395/600 |
| 5,615,337 A | | 3/1997 | Zimowski et al. | 395/200.01 |
| 5,634,121 A | | 5/1997 | Tracz et al. | 395/602 |
| 5,664,171 A | | 9/1997 | Agrawal et al. | 395/602 |
| 5,666,526 A | | 9/1997 | Reiter et al. | 395/602 |
| 5,692,171 A | | 11/1997 | Andres | 395/601 |
| 5,694,594 A | | 12/1997 | Chang | 395/606 |
| 5,701,463 A | * | 12/1997 | Malcom | 395/610 |
| 5,778,359 A | * | 7/1998 | Stent | 707/4 |
| 5,815,704 A | * | 9/1998 | Shimotsuji et al. | 395/615 |
| 5,926,812 A | * | 7/1999 | Hilsenrath et al. | 707/5 |
| 6,014,668 A | * | 1/2000 | Tabata et al. | 707/10 |
| 6,055,543 A | * | 4/2000 | Christensen et al. | 707/104 |
| 6,101,491 A | * | 8/2000 | Woods | 707/3 |
| 6,199,067 B1 | * | 3/2001 | Geller | 707/10 |
| 6,243,713 B1 | * | 6/2001 | Nelson et al. | 707/104 |
| 6,317,797 B2 | * | 11/2001 | Clark et al. | 707/200 |

FOREIGN PATENT DOCUMENTS

GB    WO 99/62012    * 12/1999

* cited by examiner

Primary Examiner—Greta Robinson
Assistant Examiner—Harold E. Dodds, Jr.
(74) Attorney, Agent, or Firm—Suiter - West

(57) ABSTRACT

A method and system for generating and utilizing a profile of a user of a computer-based information handling system is disclosed. The information handling system is searched by a profiler for files stored thereon that have been edited by the user. A located file is searched for words contained in the file, and a list of words contained in the file is compiled and added to a profile database. Descriptive information to be matched is received and compared to words stored in a profile database. If one or more words in the profile database matches the descriptive information, a match is recorded, and a score is calculated and returned.

30 Claims, 4 Drawing Sheets

AUTOMATIC PROFILER

FIELD OF THE INVENTION

The present invention generally relates to the field of computer-based information handling systems, and particularly to a method and system for automatically generating a profile of a user of a computer-based information handling system.

BACKGROUND OF THE INVENTION

It is often advantageous to determine specific information about users of computer-based information handling systems, for example, to specifically tailor the offering of goods or services to a user based upon the user's background, demographics, interests, etc. Specific user information is especially valuable to companies that provide goods or services to users via a world-wide computer-based information network such as the World Wide Web or the Internet.

Information about a user may be determined from the word content of computer files created or edited by the user directly. Information gathered based upon a user's word content for files created with a first software application may be utilized by other software applications in order to provide informed suggestions to the user based on the user's word selection. Other software applications may save time for the user by automatically searching for and gathering information which is of interest to the user without any effort or intervention required of the user. The information may be ultimately utilized to allow the user to be directed to companies that are highly likely to provide goods or services which are of interest to the user. Thus, there lies a need for a method and system for automatically determining and utilizing a profile of a computer user.

SUMMARY OF THE INVENTION

The present invention is directed to a method for generating a profile of a user of a computer-based information handling system. In one embodiment of the invention, the method includes the steps of searching the computer-based information handling system for files stored thereon, upon locating a file stored on the computer-based information handling system, determining whether the file has been edited by the user, searching the file for words contained in the file, in the event the file has been edited by the user, compiling a list of words contained in the file, and adding the list of words to a database.

The present invention is further directed to a method for utilizing a profile of a user of a computer-based information handling system. In one embodiment of the invention, the method includes the steps of receiving descriptive information to be matched from a requester, comparing the descriptive information to be matched to a database containing words indicative of the profile of the user, determining whether a word in the database matches the descriptive information to be matched, in the event the word matches the descriptive information, recording a match, calculating a score indicative of the degree of match between the word and the descriptive information, and returning the match score to the requester.

The present invention is additionally directed to a computer-based information handling system for creating and utilizing profile information of a user of the computer-based information handling system. In one embodiment of the invention, the computer-based information handling system includes a processor for interpreting and executing instructions on the computer-based information handling system, a memory coupled to said processor for storing a file edited by the user, a database, stored in the memory, for storing the profile information, and a profiler, executing on the processor, for finding and reading user edited information contained in the files and adding the user edited information to the database.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and, together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Figure 1:
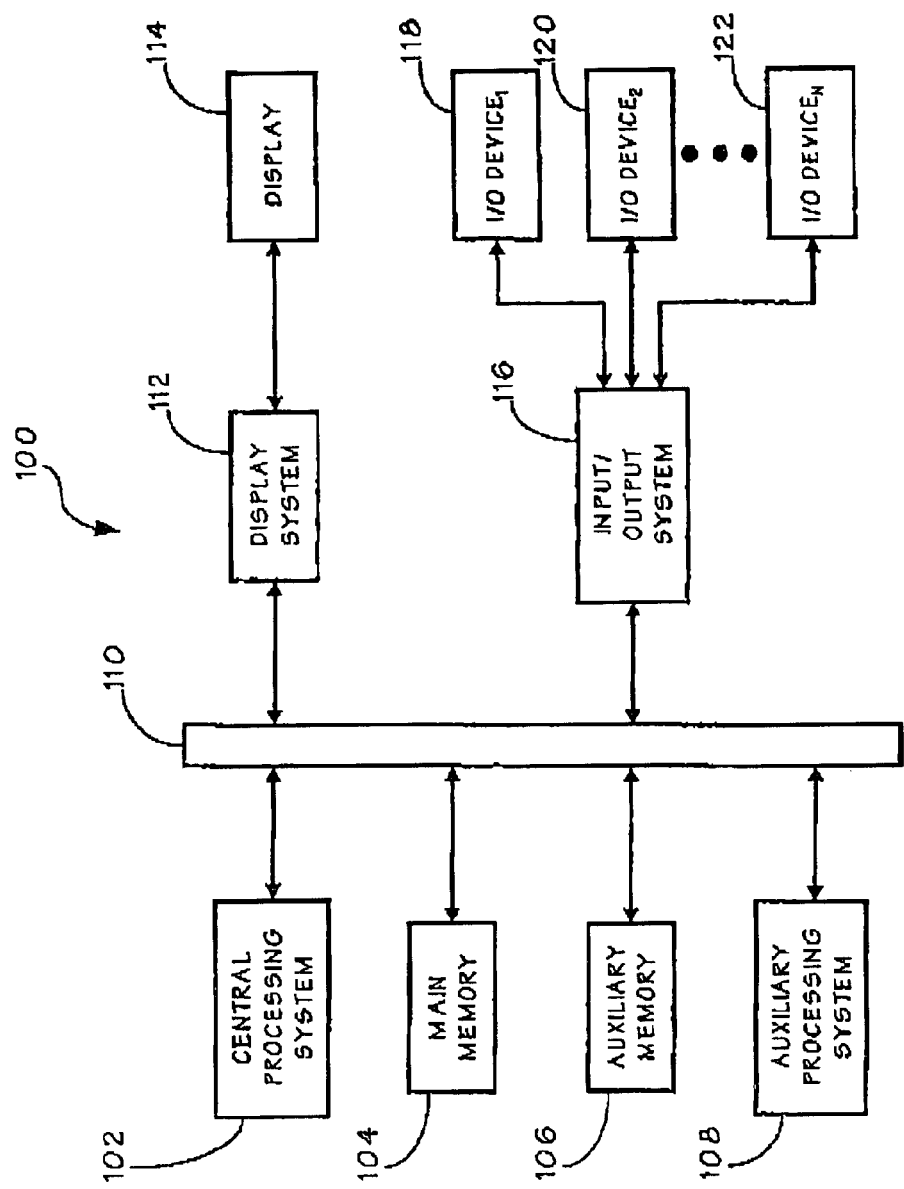
FIG. 1 is a block diagram of a computer-based information handling system operable to embody the present invention.

Referring now to FIG. 1, a hardware system in accordance with the present invention is shown. The hardware system shown in FIG. 1 is generally representative of the hardware architecture of a computer-based information handling system of the present invention. A central processing system 102 controls the hardware system 100. Central processing system 102 includes a central processing unit such as a microprocessor or microcontroller for executing programs, performing data manipulations and controlling the tasks of hardware system 100. Communication with central processor 102 is implemented through a system bus 110 for transferring information among the components of hardware system 100. Bus 110 may include a data channel for facilitating information transfer between storage and other peripheral components of hardware system 100. Bus 110 further provides the set of signals required for communication with central processing system 102 including a data bus, address bus, and control bus. Bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of hardware system 100 include main memory 104, auxiliary memory 106, and an auxiliary processing system 108 as required. Main memory 104 provides storage of instructions and data for programs executing on central processing system 102. Main memory 104 is typically semiconductor based memory such as dynamic random access memory (DRAM) and or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc read-only memory (CDROM), digital versatile disk read-only memory (DVD-ROM), digital versatile disk random-access memory (DVD-RAM), etc. Other varieties of memory devices are contemplated as well. Hardware system 100 may optionally include an auxiliary processing system 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Hardware system 100 further includes a display system 112 for connecting to a display device 114, and an input/output (I/O) system 116 for connecting to one or more I/O devices 118, 120 and up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between one or more of I/O devices 118–122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118–122 may provide or receive analog or digital signals for communication between hardware system 100 of the present invention and external devices, networks, or information sources. Input/output system 116 and I/O devices 118–122 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of hardware system 100 of FIG. 1 by one having ordinary skill in the art would not depart from the scope or the spirit of the present invention.

Figure 2:
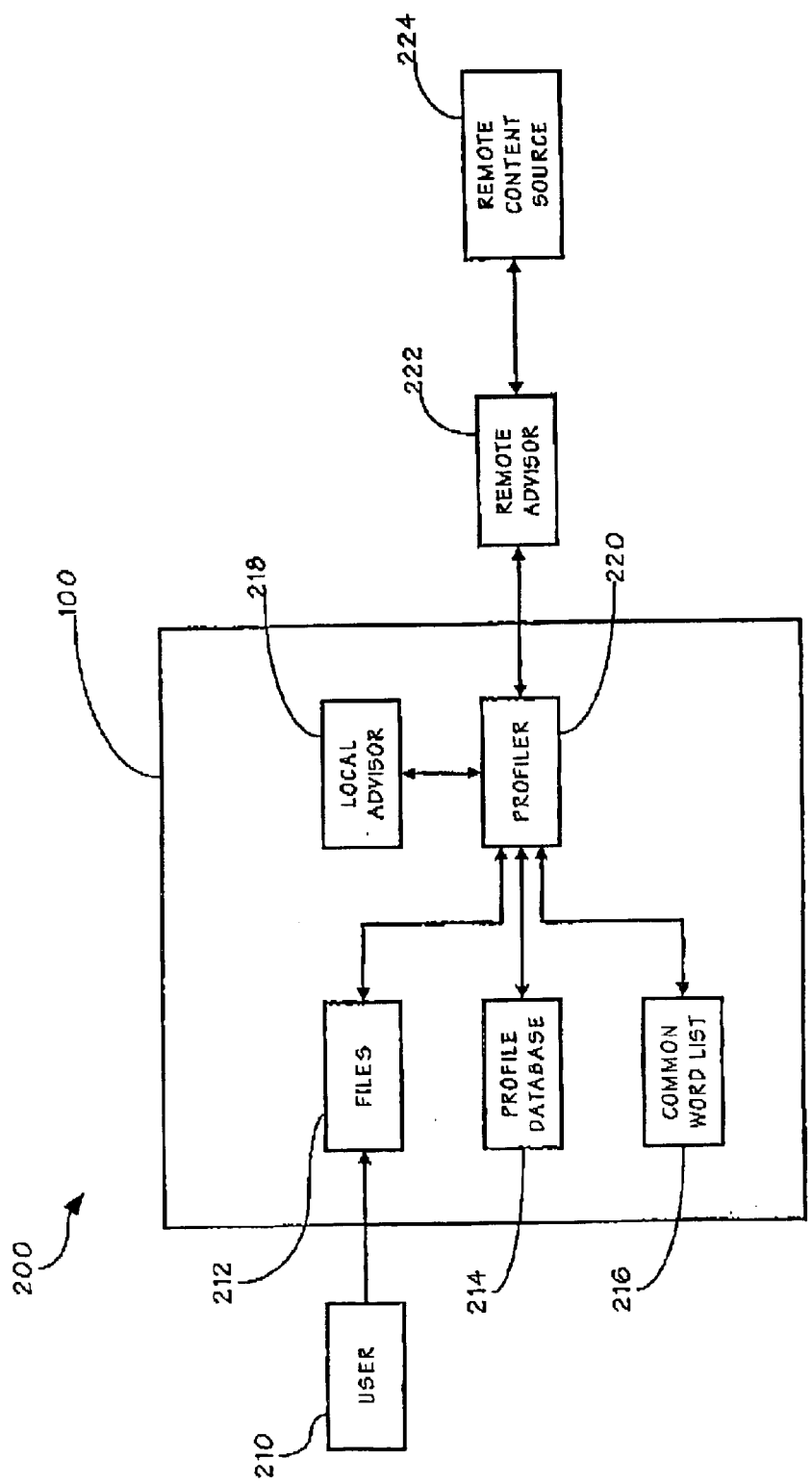
FIG. 2 is a block diagram depicting a system for generating and utilizing a profile of a user of a computer-based information handling system in accordance with the present invention.

Referring now to FIG. 2, a system for generating and utilizing a profile of a user of a computer-based information handling system in accordance with the present invention will be discussed. The system 200 may be implemented on computer-based information handling system 100 as discussed with respect to FIG. 1 being tangibly embodied via hardware, software, firmware, or a combination thereof. A user 210 of computer-based information handling system 100 inputs information into one or more files 212 which are stored in a memory of information handling system 100. Files 212 are the type of files which are created, modified, or edited by the user via direct user access and control. For example, files 212 may be text files generated with a word processor program or electronic mail (e-mail) formatted files generated by an electronic mail communications program for creating and transferring messages from a first computer or terminal to a second computer or terminal via a network. Thus, such text or e-mail files may contain words, word combinations, or phrases which are indicative of the type of subject matter of particular interest or importance in the life or business of user 210. Typically, a version of a text or e-mail file is stored in a memory of information handling system 100 as a file or as a file system 212 accessible at a later time by user 210 or by a program, task or device executing on or connected to information handling system 100.

In accordance with the present invention, a profiler 220 accesses files 212 that have been generated or edited by user 210 in order to generate a profile of user 210. Profiler 220 may be turned on or off by user 210, may be set to automatically turn on and off in response to a specific action or input, or may be set to turn on and off at periodic intervals, for example via a timer. Profiler 220 searches files 212 for files that have been recently added to or created on computer-based information handling system 100. Once one or more new text files has been located, profiler 220 scans the word contents of each file and compiles a list of the word contents. A word count for each word may also be generated and associated for each word in the list wherein frequency of occurrence of each word is determined. The compiled word list is added to a profile database 214 for user 210 that includes words highly likely to have been generated and utilized by user 210. Additionally, a date of utilization may be associated with each word such that the usage of words with respect to time may be determined. The determined usage of words with respect to time may be utilized, for example, to remove words that have not been utilized for a predetermined duration from database 214.

Profile database 214 may be made available to other program applications for utilization in accordance with the needs and requirements of that particular application. A local advisor 218 may be considered as a program application executing on computer-based information handling system 100. A remote advisor 222 may be considered as a program application executing on a computer or other information handling machine external to computer-based information handling system 100. A remote content source 224 may be coupled to remote advisor 222 where information may be stored and accessed by remote advisor 222 and transferred to computer based information handling system 100. Content information accessed by local advisor 218 may be stored in a memory of computer-based information handling system 100 and accessed via bus 110. Information accessed by local advisor 218 may be updated via input/output system 116 such as via a network. For example, local advisor 218 may be a television content advisor program executing on information handling system 100 for advising user 210 of television programming information that may hold a special interest for user 210 over all television programming in general. Such a situation may occur, for example, where an I/O device 122 of information handling system 100 comprises a television tuner such that television programming may be displayed on display 114 for viewing by user 210. Thus, local advisor 218 may determine that a particular word in profile database 216 has a high frequency of occurrence, for example greater than a predetermined limit. Local advisor 218, in response to receipt of a high frequency word from profiler 220, may provide text to be matched by profiler 220 in order to select a particular television program that is likely to be of interest to user 210 by comparing frequently occurring words to descriptive text associated with available television programming, such as the title or description of the television programming. Profiler 220 compares the descriptive programming text to words contained in profile database 214 and may calculate and return a score to local advisor 218. The returned score may include, for example, the number of words matched, frequency of occurrence of each matched word, and the last date of entry or access by user 210. This information may be compiled for each matching word. Local advisor 218 receives the returned score and utilizes the score to determine whether an offer should be made to user 210, and what television programming should be made in the offer. Local advisor 210 may then prompt user 210 with the offered programming content to determine whether user 210 is interested in the offered programming. For example, profiler 220 may indicate to local advisor 218 that the word "Sturgis" appears with a frequency of 10 in the data base, and the word "rally" appears with a frequency of 5. Local advisor 218, in response, may provide the following descriptive information to profiler for matching "Documentary: Sturgis Rally and Races—Pilgrimage of the American Biker." Profiler 220 compares the descriptive text to words contained in profile database and generates a matching score to local advisor 218. If the matching score is sufficient to justify an offer, an offer is made to user 210 to determine whether user 210 has an interest in the programming information associated with the matched descriptive text. If user 210 accepts the offer, local advisor 218 may provide the television programming associated with the matching descriptive text at an appropriate time. Further, profiler 220 may create an association between the words "Sturgis" and "rally" and the words "races", "pilgrimage", "American", and "biker". The association between words may be utilized to determine a matching score based on words that were not explicitly utilized by user 210 but words that have an associative link to words that were explicitly utilized by user 210. Thus, in the event local advisor 222 were to send a request to match "American Bikers", a match indicating a higher likelihood of user interest may be generated based on the link between the "American" and "Biker" to "Sturgis" and "rally" even when the words "American" and "Biker" were not explicitly utilized by user 210 in files 212.

In addition, profiler 220 may generate and maintain a list of commonly utilized words 216 to clients such as local advisor 218 or remote advisor 222. Common word list 216 may contain only those words having a predetermined frequency of occurrence at a level indicative of high interest to user 210. For example, user 210 may be an accomplished guitarist in which case the words "guitar" and "music" would likely appear in files 212 at a much greater frequency of occurrence than other words contained therein. Profiler 220 may place the words "guitar" and "music" into common word list 216. Thus, common word list 216 may contain only those words which appear in files at a frequency of occurrence greater than a predetermined frequency, whereas profile database 214 may contain all words utilized by user 210 regardless of frequency of occurrence. As an alternative, words that are utilized merely for grammatical mechanics or that are not likely to provide meaningful user profile information but by their nature are likely to be frequently utilized by user 210 (e.g., "is", "are", "were", "the", "a", "an", "and", "or", etc.) may be filtered from profile database 214 and common word list "216" by profiler 220 so as to not encumber matching processes and functions. Common word list 216 may be utilized when a faster matching process is desired whereas profile database 214 may be utilized when a more thorough matching process is desired. All operations for searching, updating, and maintaining profile database 214 and common word list 216 may be carried out using a standard database sublanguage such as structured query language (SQL).

The example described with respect to local advisor 218 may be similarly applied with respect to remote advisor 222, the main difference being that local advisor 218 executes on computer-based information handling system 100 whereas remote advisor 222 executes externally from information handling system 100. For example, remote advisor 222 may communicate with profiler 220 via a network to which computer-based information handling system 100 is connected. When a content match is made and offered to and accepted by user 210, content (e.g., a particular television program) may be provided to user 210 from remote content source 224 via the network. Because profiler 220 is resident in and executed by computer-based information handling system 100, profiler is capable of accessing files 212 that may be inaccessible by remote advisor 222 via network. Further, profiler 220 may access files 212 at times during which computer-based information handling system 100 is not connected to a network and may access files for a longer duration than that available for remote advisor 222 such that a more thorough and comprehensive profiling operation may be performed.

Figure 3:
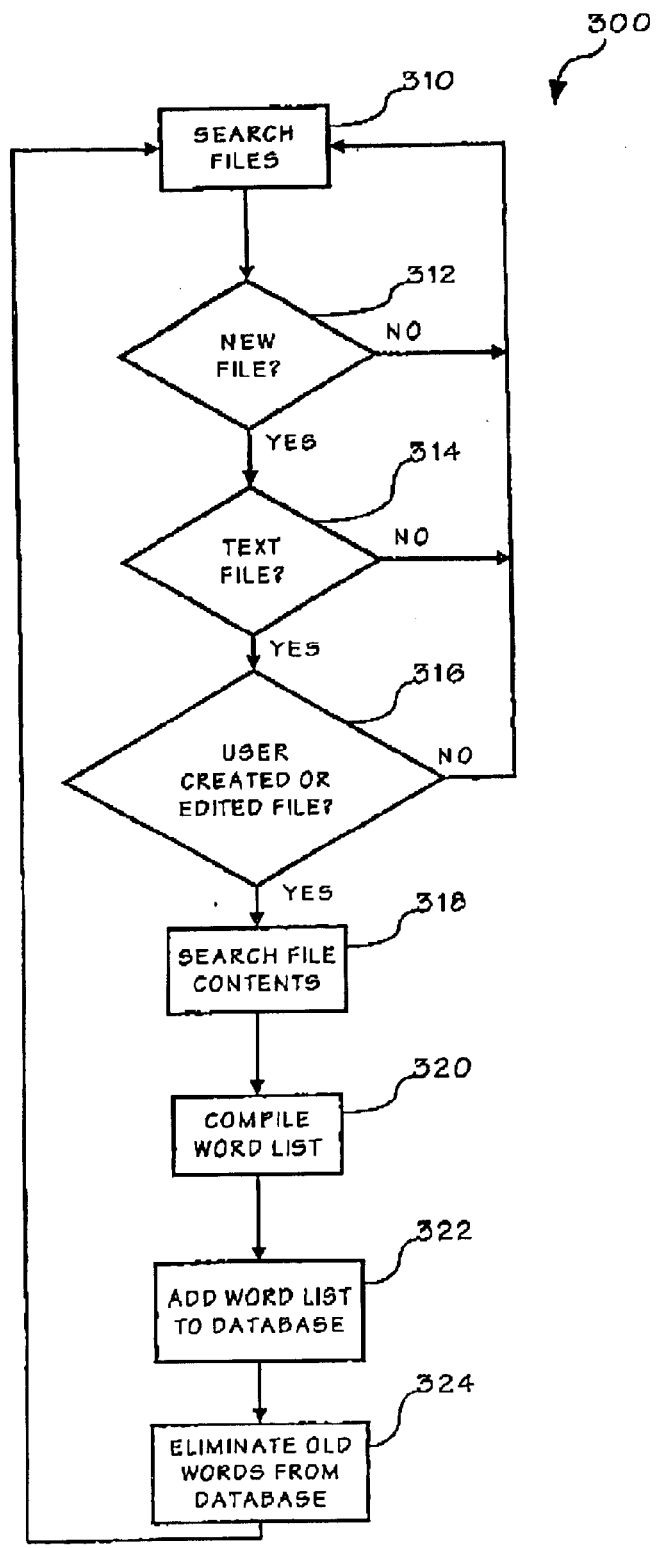
FIG. 3 is a flow diagram of a method for generating and maintaining a profile of a user of a computer-based information handling system.

Referring now to FIG. 3, a method for generating and maintaining a profile of a user of a computer-based information handling system will be discussed. The method 300 initiates with the step 310 of searching for files on computer-based information handling system 100. A file is examined and a determination is made at step 312 whether the file is a new or recently created file. In the event the file is not a new or recently created file, the file search continues at step 310. In the event the file is determined to be a new or recently created file, a determination is made at step 314 whether the file is a text file 314. In the event the file is not a text file, the file search continues at step 310. In the event the file is determined to be a text file, a determination is made at step 316 whether the file is a user created or user edited file. Any of the new files that were not directly created or edited by user 210 are eliminated, or filtered, from consideration. As a part of this step, files that have file extensions indicating that they were not edited by user 210 are eliminated. Such file extensions may include, for example, executable files (*.exe), dynamic-link library files (*.dll), and so on. In addition, binary files, files that contain sequences of data or executable code rather than human-readable text, are also eliminated from consideration. Thus, human readable text files remain for examination by profiler 220 after filtering of non-human readable binary files. Further, electronic mail formatted files may be located and considered for examination for human readable words.

In the event the file is not a user created or user edited file, the file search continues at step 310. In the event the file is a user created or user edited file, the contents of the file are searched at step 318. Upon completion of the file contents search, a word list is compiled at step 320 based upon the file content search. The compiled word list is added to a database at step 322. Old words, words that have not been utilized by user 210 for a predetermined period of time, are eliminated from database at step 324. At an appropriate time, method 300 repeats with execution of step 310. If no new files are found in step 312 after all of the files have been searched, the method ends (not shown).

Figure 4:
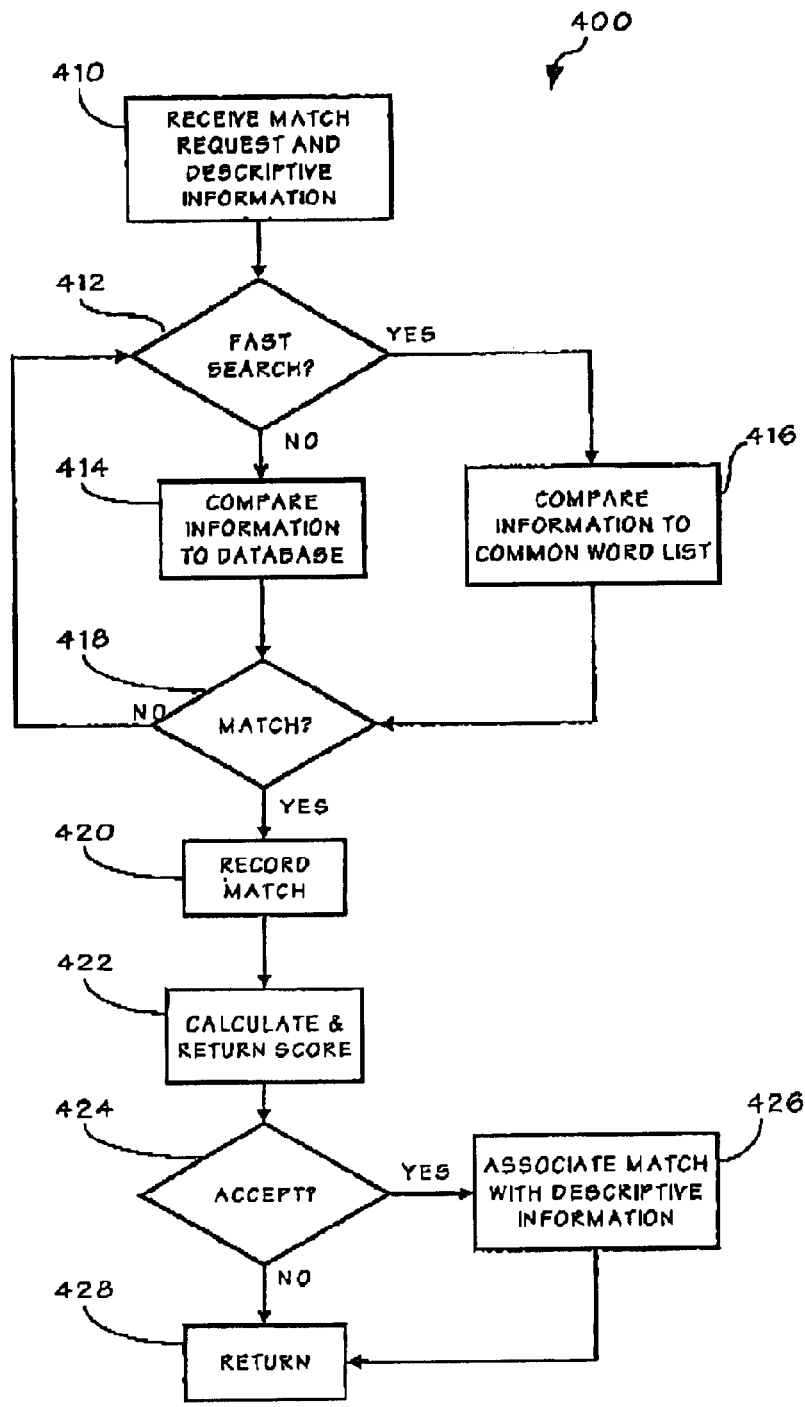
FIG. 4 is a flow diagram of a method for utilization of a profile database in accordance with the present invention.

Referring now to FIG. 4, a method for utilization of a profile database in accordance with the present invention will be discussed. The method 400 is initiated at step 410 upon profiler 220 receiving from local advisor 218 or remote advisor 222 descriptive information and a request to match the descriptive information with the profile of user 210. Based upon the request, a determination is made at step 412 whether a fast search is requested. In the event a fast search is not requested, the descriptive information is compared at step 414 to user profile information stored in profile database 214. In the event a fast search is requested, the descriptive information is compared at step 416 to user profile information stored in common word list 216. A determination is made at step 418 whether a match is made as a result of comparing step 414 or comparing step 416 between user profile information stored in profile database 214 or common word list 416, respectively. In the event a match is not made, comparing step 414 or comparing step 416 are repeated in accordance with the determination resulting from step 412 until a match is determined at step 418, and in general until profile database 214 or common word list 216 has been entirely searched. In the event a match is made as determined by step 418, a match is recorded at step 420. A score indicative of relative matching is calculated at step 422 and may be based upon, for example, the number of words matched, the frequency of occurrence of matched words, or the date of last utilization of the matched word, either alone or in combination, and the calculated score is returned to the requester (e.g., local advisor 218). A determination is made at step 424 whether the matched descriptive information is accepted, either by user 210 or requester. In the event an acceptance is made, the descriptive information is associated with the matched words 426 in profile database 214 or 216 in accordance with the determination result of step 418. In any event, method 400 is returned at step 428 to step 410 for continuance of method 400 at the appropriate time.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as auxiliary memory 106 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

Furthermore, it is understood that the teachings of the present invention can be implemented in alternative embodiments. For example, rather than scanning user created or user edited files to create a word database, a method and system can be implemented to monitor the keystroke inputs of a user, and to use these keystroke inputs to create a word database. In addition, scanning for files can take place on memory storage devices that are external to the information handling system, but in communication with the information handling system via a communications link, such as in a network or internet implementation.

It is believed that the automatic profiler of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for generating a profile of a user of a computer-based information handling system, the method comprising the following steps:
   searching predetermined files accessible to the information handling system;
   determining whether each file is a new file;
   if the file is a new file, determining whether said new file is a text file;
   if said new file is a text file, determining whether said new text file has been created or edited by the user;
   if said new text file has been created or edited by the user, searching said new user created or edited text file for user created or edited content;
   processing said user created or edited content; and
   storing said user created or edited content into a user profile database.

2. The method of claim 1, wherein said monitoring step comprises the following step:
   monitoring user keystroke inputs to said information handling system.

3. The method of claim 2, said step of determining whether a file has been created or edited by a user including the step of eliminating files of a predetermined file type from consideration.

4. The method of claim 2, said step of determining whether a file has been created or edited by a user including the step of eliminating binary files from consideration.

5. The method of claim 2, said step of determining whether a file has been created or edited by a user including the step of eliminating executable files from consideration.

6. The method of claim 2, said compiling step including the step of associating a creation or editing date to user created or edited content.

7. The method of claim 2, said compiling step including the step of associating frequency of occurrence to user created or edited content.

8. The method of 6, further comprising the step of eliminating user created or edited content from the database having an associated date earlier than a predetermined date.

9. The method of claim 7, further comprising the step of adding user created or edited content having a frequency of occurrence greater than a predetermined frequency to a common list database.

10. A method for utilizing a profile of a user of a computer-based information handling system, comprising:
   receiving descriptive information to be matched from a requester;
   comparing the descriptive information to be matched to a database containing user created or edited information indicative of the profile of the user;
   determining whether user created or edited information in the database matches the descriptive information to be matched;
   in the event the user created or edited information matches the descriptive information, recording a match;
   calculating a score indicative of the degree of match between the user created or edited information and the descriptive information; and
   returning the match score to the requester.

11. The method as claimed in claim 10, further comprising the step of determining whether an acceptance of the match occurs, and, in the event an acceptance occurs, associating the descriptive information with the matched user created or edited information in the database.

12. The method as claimed in claim 10, further comprising the step of determining whether a quicker search is desired, and, in the event a quicker search is desired, comparing the descriptive information to be matched to a list containing user created or edited information indicative of the profile of the user wherein said information has a frequency of occurrence greater than a predetermined frequency, and determining whether user created or edited information in the list matches the descriptive information to be matched, and in the event the user created or edited information matches the descriptive information, continuing the method at said recording step.

13. The method as claimed in claim 12, further comprising the step of determining whether an acceptance of the match occurs, and, in the event an acceptance occurs, associating the descriptive information with the matched user created or edited information in the database.

14. A computer readable medium whose contents cause a computer-based information handling system to execute steps for generating a profile of a user of the computer-based information handling system, the steps comprising:
   searching predetermined files accessible to the information handling system;
   determining whether each file is a new file;
   if the file is a new file, determining whether said new file is a text file;
   if said new file is a text file, determining whether said new text file has been created or edited by the user;
   if said new text file has been created or edited by the user, searching said new user created or edited text file for user created or edited content;
   processing said user created or edited content; and
   storing said user created or edited content into a user profile database.

15. The computer readable medium of claim 14, wherein said monitoring step comprises the following step:
   monitoring user keystroke inputs to said information handling system.

16. The computer readable medium of claim 15, said step of determining whether a file has been created or edited by a user including the step of eliminating files of a predetermined file type from consideration.

17. The computer readable medium of claim 15, said step of determining whether a file has been created or edited by a user including the step of eliminating binary files from consideration.

18. The computer readable medium of claim 15, said step of determining whether a file has been created or edited by a user including the step of eliminating executable files from consideration.

19. The computer readable medium of claim 15, said compiling step including the step of associating a creation or editing date to user created or edited content.

20. The computer readable medium of claim 15, said compiling step including the step of associating frequency of occurrence to user created or edited content.

21. The computer readable medium of 19, further comprising the step of eliminating user created or edited content from the database having an associated date earlier than a predetermined date.

22. The computer readable medium of claim 20, further comprising the step of adding user created or edited content having a frequency of occurrence greater than a predetermined frequency to a common list database.

23. A computer readable medium whose contents cause a computer-based information handling system to execute steps for utilizing a profile of a user of a computer-based information handling system, comprising:
   receiving descriptive information to be matched from a requester;
   comparing the descriptive information to be matched to a database containing user created or edited information indicative of the profile of the user;
   determining whether user created or edited information in the database matches the descriptive information to be matched;
   in the event the user created or edited information matches the descriptive information, recording a match;
   calculating a score indicative of the degree of match between the user created or edited information and the descriptive information; and
   returning the match score to the requester.

24. The computer readable medium as claimed in claim 23, further comprising the step of determining whether an acceptance of the match occurs, and, in the event an acceptance occurs, associating the descriptive information with the matched user created or edited information in the database.

25. The computer readable medium as claimed in claim 23, further comprising the step of determining whether a quicker search is desired, and, in the event a quicker search is desired, comparing the descriptive information to be matched to a list containing user created or edited information indicative of the profile of the user wherein said information has a frequency of occurrence greater than a predetermined frequency, and determining whether user created or edited information in the list matches the descriptive information to be matched, and in the event the user created or edited information matches the descriptive information, continuing the method at said recording step.

26. The computer readable medium as claimed in claim 25, further comprising the step of determining whether an acceptance of the match occurs, and, in the event an acceptance occurs, associating the descriptive information with the matched user created or edited information in the database.

27. A computer-based information handling system for creating and utilizing profile information of a user of the computer-based information handling system, comprising:

a processor for interpreting and executing instructions on the computer-based information handling system;

a memory coupled to said processor for storing a file created or edited by the user;

a database, stored in said memory, for storing the profile information; and a profiler, executing on said processor, for determining whether the file is a new text file created or edited by the user, finding and reading user created or edited information contained in the new text file created or edited by the user, and adding user created or edited information to said database.

28. The computer-based information handling system as claimed in claim 27, further comprising a list of user created or edited information, said profiler adding user created or edited information found in the file having a frequency of occurrence greater than a predetermined frequency to said list.

29. A computer-based information handling system for creating and utilizing profile information of a user of the computer-based information handling system, comprising:

means for interpreting and executing instructions on the computer-based information handling system;

means coupled to said processor for storing a file created or edited by the user;

means, stored in said memory, for storing the profile information; and means, executing on said interpreting and executing means, for determining whether the file is a new text file created or edited by the user, finding and reading user created or edited information contained in the new text file created or edited by the user, and adding the user created or edited information to said profile information storing means.

30. The computer-based information handling system as claimed in claim 29, further comprising a means for storing common user created or edited information, said finding and reading means adding user created or edited information found in the file having a frequency of occurrence greater than a predetermined frequency to said common storing means.

* * * * *